United States Patent
Rothermel et al.

[15] 3,653,864
[45] Apr. 4, 1972

[54] DEALKALIZATION OF GLASS SURFACES

[72] Inventors: Daphne L. Rothermel; Stanley D. Stookey, both of Corning, N.Y.

[73] Assignee: Corning Glass Works, Corning, N.Y.

[22] Filed: Mar. 17, 1969

[21] Appl. No.: 807,984

[52] U.S. Cl. ........................................... 65/30, 65/31, 65/32, 117/54, 117/124, 156/2, 156/15, 156/24, 156/134
[51] Int. Cl. ........................................................ C03c 15/00
[58] Field of Search .................. 65/30, 31, 32; 117/54, 124; 156/2, 15, 24, 134

[56] References Cited

UNITED STATES PATENTS

| | | | |
|---|---|---|---|
| 2,184,320 | 12/1939 | Simpson | 156/24 X |
| 2,261,689 | 11/1941 | Lyle et al. | 65/30 X |
| 2,377,062 | 5/1945 | Adams | 65/31 |
| 3,275,470 | 9/1966 | Charles | 65/32 |

Primary Examiner—Frank W. Miga
Attorney—Clarence R. Patty, Jr. and Gerald S. Geren

[57] ABSTRACT

This invention relates to the improvement in surface durability of alkali metal oxide containing glasses through the removal of the alkali metal oxide by a treatment which comprises hydrating the alkali metal oxide containing glass in an autoclave, and thereafter dealkalizing the glass surface by contacting it, at a moderate temperature, with a non-acidic non-aqueous solvent having a high dielectric constant. The resultant surface has substantially improved chemical surface durability.

4 Claims, No Drawings

DEALKALIZATION OF GLASS SURFACES

BACKGROUND OF THE INVENTION

Alkali metal oxide containing silicate glasses, such as soda-lime-silicate ($Na_2O$—$CaO$—$SiO_2$) glasses, can weather badly. For example, window glasses are known to weather. This weathering is a result of the breakdown of the silica structure by the attack of water made alkaline by the $Na_2O$ or $K_2O$ of the glass. Similar problems occur in various containers and other types of glass articles made with alkali metal oxide containing glasses.

The durability of these glasses has been improved by modifying the chemical composition thereof with additions of alumina or boric oxide and/or by reducing the alkali content itself. These changes, however, can create problems in the melting and forming of the glass. Moreover, the effect of these changes has been somewhat limited. Other techniques for reducing the alkali content of the glass have been attempted. For example, glasses have been treated in acidic solutions so as to exchange hydrogen ions from the solution with sodium ions from the glass. This treatment has improved the surface durability of the glass; however, the resulting surface may be very fragile and/or porous. Another technique, which is somewhat similar, has been the treatment of those glasses in a moist sulfurous atmosphere at temperatures between 400° and 700° C. which, again, results in an exchange of hydrogen for sodium ions. The hydrogen ion is available from water vapor in the air. Still another technique for removing the alkali from the surface has been a similar ion exchange employing various clays. However, the clay treatment must also be performed at high temperatures. Thus, the various available treatments are not completely satisfactory in that they do not produce good surfaces, require relatively high treatment temperatures and/or require the use of a corrosive atmosphere.

SUMMARY OF THE INVENTION

We have discovered that we can improve the chemical surface durability of alkali metal oxide containing glasses while maintaining a good surface, by treating the glass so as to hydrate the surface thereof and by then dealkalizing the hydrated glass by treating it with a non-acidic non-aqueous solvent having high dielectric constant. The term non-acidic as used herein refers to solvents which when diluted with water, in the proportion of 9 parts by volume of solvent to 1 part by volume water, exhibit a pH above about 6. The glasses which may be treated by this invention can be binary alkali metal oxide silicate glasses or they may be more complex silicate glasses having other modifying and/or network forming oxides therein. We believe that the hydration treatment causes the hydrolysis of the glass network and the creation of alkali hydroxide (ROH) in the glass. After hydration, preferably performed in an autoclave, the glass is treated with a suitable non-acidic non-aqueous solvent having a high dielectric constant, so as to remove the alkali hydroxide without damaging the silica network. It is further believed that the solvent should have a molecular size sufficiently small so as to penetrate the glass surface and thus contact the alkali hydroxide thereby removing it from the glass surface. Furthermore, the dielectric constant of the solvent should be sufficiently high so as to make it a good solvent for ionic compounds, such as ROH. The dealkalization treatment is carried out at temperatures above which the hydrated glass is soft, but below the boiling point of the solvent and below the temperature at which the hydrated glass will blister or foam. The length of treatment time, in the solvent, is that which is sufficient to remove the alkali hydroxide from the surface. By the described technique substantial amounts of alkali metal oxides have been removed from the surfaces of the glasses; for example, amounts greater than about 75 percent by weight of the original alkali metal oxide have been removed from the treated surfaces.

DESCRIPTIONS OF THE PREFERRED EMBODIMENTS

Our invention can be practiced with alkali metal oxide containing glasses. We prefer to use glasses containing soda ($Na_2O$) and/or potassia ($K_2O$). The glasses can be simple binary glasses, such as sodium silicates or potassium silicates, or the glasses may have various combinations of the alkali metal oxides, such as a sodium-potassium-silicate glass. Moreover, the glasses may contain any of the normal modifying oxides, such as the bivalent oxides ($CaO$, $MgO$, $BaO$) and other network forming oxides such as ($B_2O_3$, $Al_2O_3$, $P_2O_5$). We have found that in order to improve the surface durability of a binary alkali silicate glass it must contain at least about 10 weight percent alkali metal oxide. In more complex glasses, there must be at least about 15 weight percent alkali metal oxide. The maximum amount of alkali metal oxide would be that amount whereat a glass would no longer form. In the case of the binary glasses, that amount would be about 45 weight percent. The glasses described above are capable of hydration, in either an autoclave or a moist atmosphere.

Typical glasses which will meet the aforementioned requirements are set forth below in Table I, in weight percent as calculated from the batch. Batches of the proper compositions are compounded from materials, either oxides or other compounds which, on being melted together, will be converted to the desired oxide compositions in the proper proportions. The batch materials are carefully blended together, usually ball-milled to aid in obtaining a homogeneous melt, and then melted in open platinum or silica crucibles for about 5–6 hours at temperatures between about 1,450°–1500° C.

TABLE I

|         | 1    | 2    | 3    | 4    | 5    | 6    | 7    | 8    |
|---------|------|------|------|------|------|------|------|------|
| $SiO_2$ | 73.5 | 68.7 | 60.0 | 85.0 | 59.2 | 53.0 | 59.4 | 77.5 |
| $Na_2O$ | 26.5 | 13.3 | —    | —    | —    | 21.3 | 30.7 | 22.5 |
| $K_2O$  | —    | 18.0 | 40.0 | 15.0 | 21.0 | —    | —    | —    |
| PbO     | —    | —    | —    | —    | 19.8 | 25.7 | —    | —    |
| BaO     | —    | —    | —    | —    | —    | —    | 9.9  | —    |

The glasses as disclosed above may be hydrated by being exposed to a moisture containing and/or a steam containing atmosphere, at a temperature between about 80° and 200° C. for a sufficient length of time to hydrate the surface thereof. A particularly useful technique for hydrating the surface is to place the glass in a heating chamber, or autoclave, into which steam can be introduced in a volume sufficient to create and maintain an atmosphere of at least about 50 percent by weight steam, and, preferably, essentially 100 percent by weight steam. For practical reasons, air constitutes that part of the atmosphere other than steam but various other inert gases such as helium, argon, nitrogen, carbon dioxide, etc. can be utilized. Furthermore, dry steam is preferred but wet steam may also be utilized. We prefer to operate the autoclave at 120° C. and 18 p.s.i. Under the aforementioned conditions, hydration can be effected in between about one-fourth and 16 hours.

The autoclave treatment as described above results in the hydration of the glass surface and the creation of alkali hydroxide in the glass. For example in a sodium silicate glass, the reaction is believed to loosen sodium from the glass network by breaking sodium-oxygen-silicon bonds and replacing the sodium by hydrogen so as to form hydroxyl ions thereat. The remaining free sodium ion then reacts the hydroxyl ions so as to form sodium hydroxide which is loosely held in the glass surface. The hydration is allowed to continue so as to provide a minimum depth of reaction of at least 1 micron. This minimum is necessary to ultimately provide the desired durability. The maximum depth of treatment is dependent upon the processing conditions and glass composition. Binary glasses containing about 25 mole percent alkali can by hydrated through the entire thickness.

The hydrated sample is then removed from the autoclave and its surface is contacted with the non-acidic non-aqueous solvent, having a high dielectric constant, so as to remove the alkali hydroxide.

The normal method of treatment is to contact the hydrated glass surface with the selected solvent, and this is most easily done by immersing the hydrated glass in the solvent. A non-aqueous solvent is chosen because water would attack the network itself. The most effective solvents are those having a high dielectric constant, normally in excess of 40. Furthermore, the molecular size of the solvent should be sufficiently small so that it may penetrate the glass surface and remove the alkali hydroxide. We have found that the non-aqueous solvents may be diluted with up to about 20 volume percent water without adversely affecting the dealkalizing ability of the solvent. Particular non-aqueous solvents that we have found to be operable are formamide, dimethyl formamide, n-methyl propionamide, and dimethyl sulfoxide and mixtures thereof.

The treatment of the hydrated glass with the solvent should be at a temperature above which the hydrated layer is soft, so as to allow the removal of the alkali hydroxide. However, the treatment temperature should not be above that at which the glass will foam or blister from the vaporization of the water therein; furthermore, the temperature should be below the boiling point of the solvent. Usually, the glasses operable in our invention will blister at temperatures lower than the boiling point of the solvent. Typically, the glasses will be sufficiently soft to allow the removal of the alkali hydroxide at temperatures greater than about 90° C. However, these glasses may blister at temperatures in excess of 135° C. Therefore, as a practical matter, the temperatures at which the glasses may be treated with the solvent are between about 90° and 135° C. The length of time of treatment is that which is sufficiently long to remove a major portion of the alkali hydroxide. This time of treatment depends upon the treatment temperature, the solvent, and glass being used; at temperatures between 90° c. and 135° C. the time is usually between about 10 and 15 minutes. As the alkali hydroxide is being removed from the glass surface the surface tends to contract or shrink thus inhibiting the outward movement of other alkali hydroxide further within the glass. Thus, long treatment times on the order of 60 minutes, are not extremely beneficial since during the early stages of treatment most of the alkali hydroxide which can be removed is removed.

The surface of treated samples has proved to be significantly lower in alkali content than the original or untreated sample. For example, a glass originally containing 26 percent by weight soda has been found after treatment to contain at the surface about 5 percent by weight of soda. A single treatment with the aforementioned solvents can reduce the alkali content of the glass by at least about 50 percent, with dimethyl formamide and at least about 75 percent with formamide, n-methyl propionamide and dimethyl sulfoxide. This decrease in alkali content explains the significant improvement in chemical durability. We have found that in order to provide a surface of improved durability, the depth of alkali removal must be at least 1 micron. From a surface durability point of view, there is no maximum depth of treatment; however, in view of the various processing parameters, mechanical durability, and other factors, there is no practical advantage in treating to a depth greater than about 40 microns.

The durability of the glasses has been determined by comparative tests which show the effect of weathering on glasses treated by this process and on untreated glasses. In general, after weathering under conditions where the untreated glasses form a white haze, or bloom, on the surface, no bloom will form on the treated samples. Thus, the treated samples will not weather under those conditions necessary to produce initial weathering in the untreated pieces.

The following examples will better illustrate our invention.

EXAMPLE 9

A sodium silicate glass consisting essentially, in weight percent, of 26 percent $Na_2O$ and 74 percent $SiO_2$, was prepared. The glass was formed into a cane 4½ inches long and one-fourth inch in diameter. The glass cane was then placed in an autoclave which was raised to a temperature of 120° C. and pressure of 18 psi, whereat the atmosphere was steam saturated, for 1 hour. This treatment hydrated the surface of the glass to a depth of about 200 microns. The hydrated glass sample was then placed in a formamide bath. The formamide and glass were heated to 90° C. for 15 minutes. The sample was then removed and the surface was found to be de-alkalized to a depth of about 40 microns. The surface of the glass treated as above was found to be more resistant to weathering than an untreated glass of the same composition.

EXAMPLE 10

An ordinary soda-lime glass of the following composition, in weight percent: 73.2 percent $SiO_2$, 0.8 percent $Al_2O_3$, 17 percent $Na_2O$, 0.4 percent $K_2O$, 5.2 percent CaO, and 3.5 percent MgO, was cut into two 1¾ × ½ × 3/16 inch strips and the surfaces then ground and polished. One strip was autoclave treated for 4 hours at 120° C. and 18 p.s.i. This developed a hydrated layer at least one micron thick. The hydrated glass was then placed in a formamide bath at 95° C. for 15 minutes. After formamide treatment, the treated and untreated glasses were exposed to a 98 percent relative humidity atmosphere at 50° C. for 1 month. After the weathering test the treated and untreated samples were washed and the untreated sample had developed a permanently etched, cloudy surface that could not be washed clear while the treated glass was washed and had remained clear and transparent.

We claim:

1. A method of dealkalizing an alkali metal oxide-containing silicate glass without damaging the silica network thereof comprising the steps of:
   a. hydrating the surface of the glass article by subjecting it to an atmosphere consisting essentially of 50–100 percent by weight of steam at a temperature between about 80°–200° C. for a period of time at least sufficient to provide a hydrated layer at least about 1 micron in depth containing an alkali metal hydroxide reaction product; and
   b. contacting the surface of the glass with a non-acidic, non-aqueous solvent having a dielectric constant in excess of about 40 selected from the group consisting of formamide, dimethyl formamide, n-methyl propionamide, dimethyl sulfoxide, and mixtures thereof at a temperature in excess of the softening point of the hydrated layer but below the temperature at which that layer will blister for a period of time sufficient to remove the alkali metal hydroxide hydration product from the glass without damaging the silica network of said glass.

2. A method according to claim 1 wherein the period of time sufficient to provide a hydrated layer at least about 1 micron in depth ranges from about one-fourth – 16 hours.

3. A method according to claim 1 wherein the temperature at which the surface of the glass is contacted with the non-acidic, non-aqueous solvent ranges from about 90°–135° C.

4. A method according to claim 3 wherein the period of time sufficient to remove the alkali metal hydroxide hydration product from the hydrated layer ranges between about 10–15 minutes.

* * * * *